United States Patent
Yang et al.

(10) Patent No.: US 9,897,514 B2
(45) Date of Patent: Feb. 20, 2018

(54) MACHINE ARRANGEMENT

(71) Applicant: AKTIEBOLAGET SKF, Göteborg (SE)

(72) Inventors: Hongyu Yang, Houten (NL); John F. van de Sanden, Nieuwegein (NL); Hendrik Anne Mol, Sleeuwijk (NL)

(73) Assignee: AKTIEBOLAGET SKF, Gothenburg (SE)

( * ) Notice: Subject to any disclaimer, the term of this patent is extended or adjusted under 35 U.S.C. 154(b) by 341 days.

(21) Appl. No.: 14/406,923

(22) PCT Filed: Jun. 14, 2013

(86) PCT No.: PCT/EP2013/062358
§ 371 (c)(1),
(2) Date: Dec. 10, 2014

(87) PCT Pub. No.: WO2013/186354
PCT Pub. Date: Dec. 19, 2013

(65) Prior Publication Data
US 2015/0343553 A1 Dec. 3, 2015

(30) Foreign Application Priority Data

Jun. 14, 2012 (WO) .................. PCT/EP2012/061347

(51) Int. Cl.
*F16C 41/00* (2006.01)
*G01M 11/08* (2006.01)
(Continued)

(52) U.S. Cl.
CPC ............. *G01M 11/086* (2013.01); *B32B 7/04* (2013.01); *B32B 17/06* (2013.01); *C03C 27/046* (2013.01);
(Continued)

(58) Field of Classification Search
CPC ........ F16C 41/00; F16C 33/58; F16C 33/586; F16C 2226/34; F16C 2226/36; B32B 7/04;
(Continued)

(56) References Cited

U.S. PATENT DOCUMENTS 4,959,258 A * 9/1990 Yoshida ................ C04B 37/026
156/304.3
5,594,819 A * 1/1997 Narendran ............. G01B 11/18
250/227.14
(Continued)

FOREIGN PATENT DOCUMENTS

GB 761662 A 11/1956

OTHER PUBLICATIONS

"Brazing Filler Metals." Brazing Metals & Alloys | Lucas-Milhaupt. Lucas-Milhaupt, Inc., 2017. Web. Apr. 28, 2017. <http://www.lucasmilhaupt.com/en-US/products/fillermetals/1/>.*
(Continued)

*Primary Examiner* — Josh Skroupa
*Assistant Examiner* — Cory B Siegert
(74) *Attorney, Agent, or Firm* — Bryan Peckjian; SKF USA Inc. Patent Dept.

(57) ABSTRACT

A machine arrangement, comprising at least one carrier, wherein a glass fiber is connected with the machine arrangement. To allow a proper measurement of stresses even at curved surfaces of the machine arrangement, as it is typical in the case of a carrier being attached to bearing rings, the connection between the glass fiber and the machine arrangement is established by a metallic material which metal material is connected by material bonding with the machine arrangement as well as with the glass fiber.

1 Claim, 7 Drawing Sheets

(51) Int. Cl.
*C03C 27/04* (2006.01)
*G01M 13/04* (2006.01)
*G01L 1/24* (2006.01)
*B32B 7/04* (2006.01)
*B32B 17/06* (2006.01)
*F16C 33/58* (2006.01)

(52) U.S. Cl.
CPC ............ *F16C 33/586* (2013.01); *F16C 41/00* (2013.01); *G01L 1/246* (2013.01); *G01M 13/04* (2013.01); *B32B 2250/02* (2013.01); *B32B 2262/101* (2013.01); *Y10T 403/479* (2015.01)

(58) Field of Classification Search
CPC ............... B32B 17/06; B32B 2250/02; B32B 2262/101; C03C 27/046; C03C 27/02; C03C 27/04; G01L 1/246; G01L 1/24; G01L 1/242; G01M 11/086; G01M 13/04; G01M 11/08; G01M 11/085; G01M 11/083; Y10T 403/477; Y10T 403/478; Y10T 403/479; F16B 5/08; B23K 2203/54

USPC .......................................... 403/270, 271, 272
See application file for complete search history.

(56) References Cited

U.S. PATENT DOCUMENTS

| | | | |
|---|---|---|---|
| 6,923,048 B2 * | 8/2005 | Willsch | G01L 1/246 374/E11.015 |
| 2007/0169580 A1 * | 7/2007 | Carrier | F16H 1/166 74/425 |
| 2009/0157092 A1 * | 6/2009 | Blumenkranz | G01L 1/246 606/130 |

OTHER PUBLICATIONS

"Stainless Steel 316—Alloy Composition." ESPI Metals. ESPICorp Inc., 2017. Web. Apr. 28, 2017. <http://www.espimetals.com/index.php/192-technical-data/stainless-steel-316-alloy-composition/202-stainless-steel-316-alloy-composition>.*

* cited by examiner

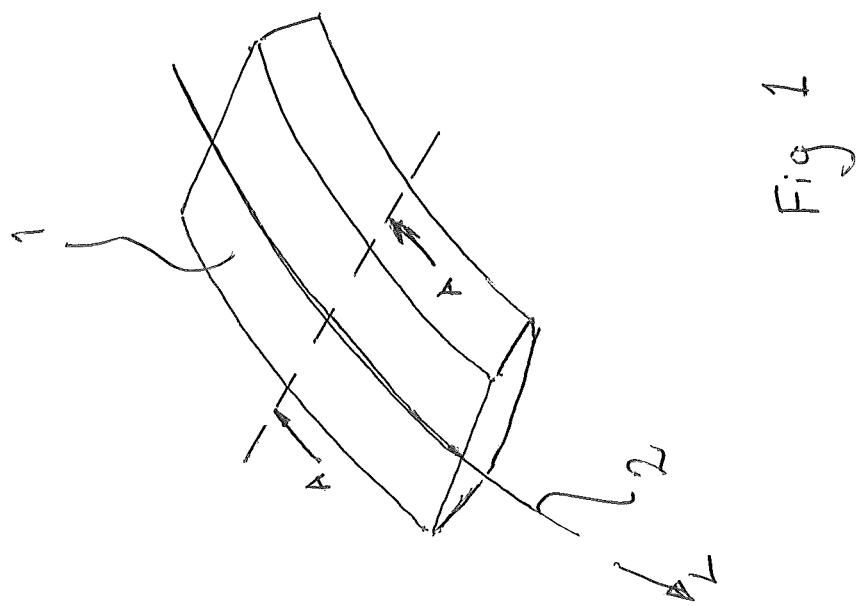

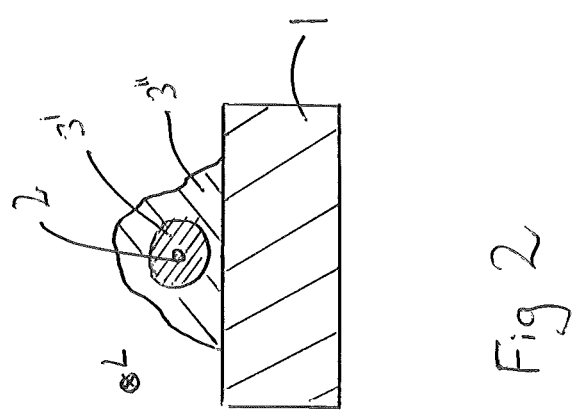

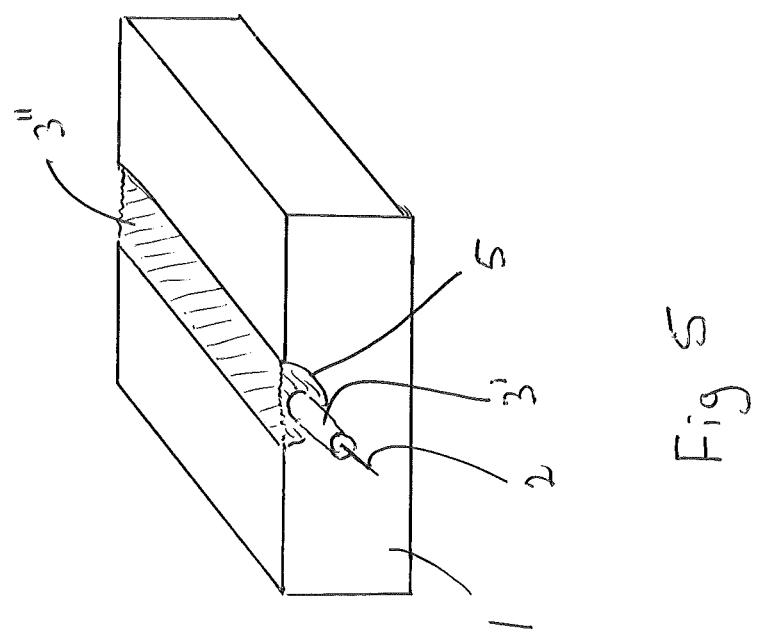

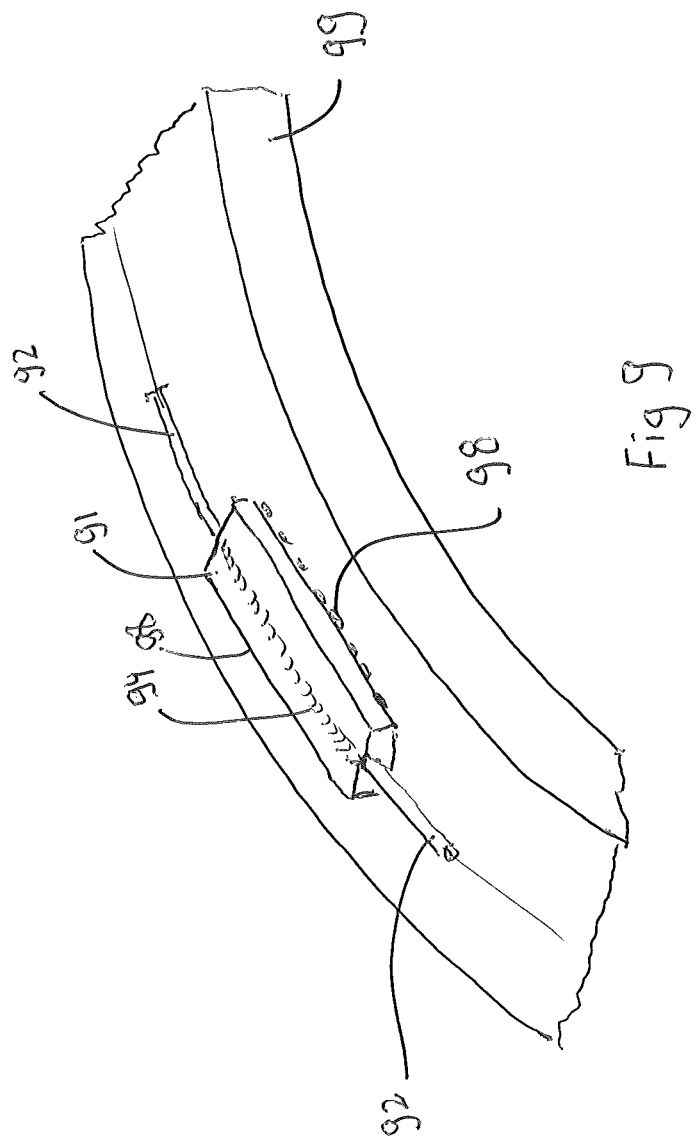

MACHINE ARRANGEMENT

CROSS REFERENCE TO RELATED APPLICATIONS

This is a National Stage Application claiming the benefit of International Application Number PCT/EP2013/062358 filed on 14 Jun. 2013, which claims the benefit of European Patent Application Serial Number PCT/EP2012/061347 filed on 14 Jun. 2012, both of which are incorporated herein by reference in their entireties.

TECHNICAL FIELD

The invention relates to a machine arrangement, comprising at least one carrier, wherein a glass fiber is connected with the machine arrangement, wherein the connection between the glass fiber and the machine arrangement is established by a metallic material which metal material is connected by material bonding with the machine arrangement as well as with the glass fiber.

BACKGROUND

A machine arrangement of the generic kind is disclosed in U.S. Pat. No. 5,594,819 A. A similar solution is shown in GB 761 662 A.

It is known in the art to equip a machine part of this kind with a glass fiber element to allow the measurement of different physical parameters. By doing so, a survey of the parameters becomes possible by using the fiber Bragg grating (FBG) method. By this method temperatures as well as strains of the machine arrangement can be monitored.

For doing so it is necessary to connect a glass fiber with the component. For surveying temperatures it is essential that a thermal coupling between the glass fiber and the machine arrangement is established. For monitoring strains it is necessary to mechanically connect the glass fiber with the component to be monitored.

Specifically in the latter case problems arise because the glass fiber is normally equipped with a plurality of coaxially arranged cover layers. A typical construction employs a cladding arranged around the glass fiber (core) itself; the cladding is coated by a coating layer. Then, strengthening fibers (made e. g. from aramid) are arranged at the outer circumference of the coating. Finally the strengthening fibers are cased by a hollow cylindrical cable jacket.

When a glass fiber element of this type is connected with the component a certain elasticity is inherent between the glass core and the component. Thus, specifically the measurement of strains is problematic due to the elasticity. This is specifically a problem when the component is not even or flat but if it has a spherical shape. This is typical in the case of a part of a bearing, specifically of a roller bearing.

It is an object of the present invention to propose a machine arrangement of the above mentioned kind which is designed in such a manner that a contact is established between the glass fiber core and the component which is as stiff as possible. By doing so it is aimed to monitor physical properties, especially of strains in the component, with a high degree of precision. Thus, specifically a proper measurement of stresses should become possible even at curved surfaces of the machine arrangement as is typical in the case of bearing rings.

SUMMARY OF THE INVENTION

A solution according to the invention is characterized in that the carrier comprises a groove in which the glass fiber is arranged, wherein a filling material is arranged between the glass fiber and the carrier, wherein the glass fiber is embedded into the carrier by brazing, wherein the carrier is attached to the machine part by means of pulse arc welding.

The glass fiber is basically free from any layer as described above. An exception can be that the glass fiber is encased by a reflective cover material to ensure the conduction of light through the glass fiber.

The metallic material preferably consists of at least two different metallic materials, wherein a first metallic material encases the glass fiber and wherein a second metallic material connects the first metallic material with the machine arrangement by material bonding.

The material bonded connection between the metallic material and the machine arrangement can be established by a welding process using the metallic material.

The material bonded connection between the metallic material and the glass fiber can also be established by a welding or melting process using the metallic material.

The mentioned first metallic material can be a single metal element. In this case a preferred embodiment proposes that the first metallic material is chromium (Cr). An alternative suggests nickel (Ni) as the first metallic material.

The second metallic material can be a metal alloy. In this case the second metallic material can be an alloy of chromium (Cr) and nickel (Ni).

In a preferred embodiment of the invention, a cladding of nickel (Ni) which encases the glass fiber is provided; this cladded glass fiber is then coated with a nickel-chromium-alloy.

The second metallic material can have at least partially a thickness measured in the direction perpendicular to the longitudinal axis of the glass fiber of at least 0.3 mm, preferably of at least 0.5 mm.

The glass fiber can be arranged on a curved surface of the machine arrangement, especially on a cylindrical or flat surface of a carrier of the machine arrangement. The carrier in turn being arranged on a bearing ring of the machine arrangement.

Thereby, the glass fiber can be attached to a cylindrical or flat surface of the machine arrangement. Also, it is possible to locate the glass fiber in a groove which is machined for the glass fiber into the machine arrangement.

A solution is a machine arrangement, comprising or being at least one carrier, wherein a glass fiber is connected with the machine arrangement. The connection between the glass fiber and the machine arrangement is established by a metallic material which metal material is connected by material bonding with the machine arrangement as well as with the glass fiber.

Suitably the glass fiber is encased by a reflective cover material. The metallic material can consists of at least two different metallic materials, wherein a first metallic material encases the glass fiber and wherein a second metallic material connects the first metallic material with the machine arrangement by material bonding. The material bonded connection between the metallic material and the machine arrangement can be established by a vacuum brazing process using the metallic material. The glass fiber is connected with the carrier. The carrier can be made of stainless steel. The first metallic material is suitably a single metal element such as nickel (Ni). The second metallic material is suitably a metal alloy such as a brazing alloy comprising silver (Ag) and copper (Cu) such as Cusin-1 ABA. The carrier can be connected by means of pulse arc welding to a machine part made of hardened steel.

All the features can be individually joined together in any desired way as long as no conflicting features are joined.

By the proposed design a stiff and direct connection is established between the glass fiber and the component to be monitored so that physical parameters—especially temperatures and strains—can be detected in a precise way.

BRIEF DESCRIPTION OF THE DRAWINGS

The drawings show embodiments of the invention.

FIG. 1 shows in a perspective view a section of a carrier intended to be attached to an outer bearing ring of a roller bearing, on which a glass fiber is fixed, FIG. 2 shows the cross section A-A according to FIG. 1, FIG. 5 shows a perspective view of a glass fiber which is fixed in a groove of a carrier, FIG. 9 shows a isometric view of a section showing a carrier mounted to an outer ring of a bearing, wherein the carrier supports the mounted optical fiber.

DETAILED DESCRIPTION OF THE INVENTION

Figure 4:
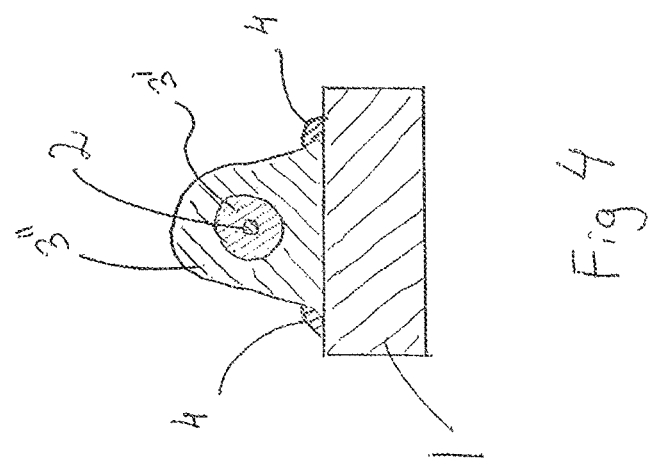
FIG. 4 shows a front view of a glass fiber which is fixed to a carrier, similar to FIG. 3.

In FIG. 1 a machine arrangement 1 is shown being a carrier to be attached to an outer bearing ring of a roller bearing of the machine arrangement. The carrier 1 has an outer spherical surface which is to be monitored with respect to strains which act in the machine part. The survey of those strains is carried out by the fiber Bragg grating (FBG) method which is known as such. Reference is made e. g. to U.S. Pat. No. 6,923,048 B2 where this technology is explained in more detail.

For doing so a glass fiber 2 is securely fixed on the spherical, i.e. cylindrical outer circumference of the carrier 1. The glass fiber 2 has a longitudinal direction L which extends in the circumferential direction of the carrier 1.

Details concerning the fixation of the glass fiber 2 at the carrier 1 can be seen from FIG. 2.

Here, it can be seen that the glass fiber 2 is basically the pure glass element—possibly covered only by a reflective coating to ensure proper light conduction within the glass fiber—which is then connected with the carrier 1 by means of metallic material 3.

Here, two different metallic materials are employed:

A first metallic material 3' coats the glass fiber 2 itself. The preferred material is chromium (Cr).

The first metallic material 3' it then connected with a second metallic material 3". This material is preferably an alloy, preferably from chromium (Cr) and nickel (Ni).

Thus, a material bonding is established between the glass fiber 2 and the machine part 1 to be monitored. This means, all strains in the machine part 1 are directly transferred into the glass fiber 2. Thus, the precondition is assured for a precise measurement of physical parameters of the machine part 1.

Figure 3:
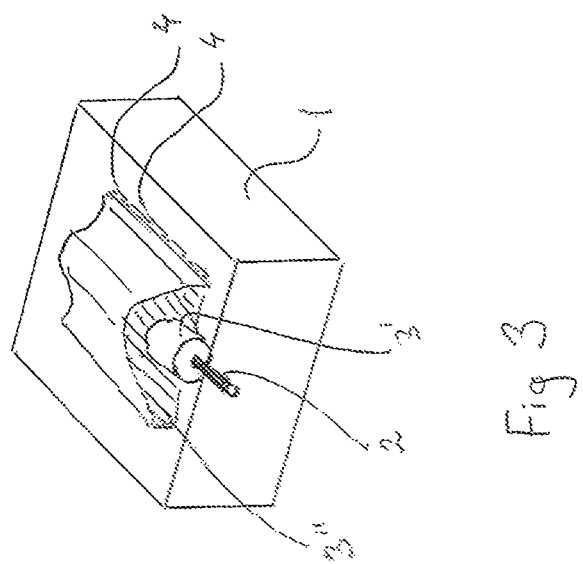
FIG. 3 shows a perspective view of a glass fiber which is fixed to a carrier similar to FIG. 2.

In FIG. 3 a further embodiment of the invention is shown. Here, the glass fiber 2 is provided with a cladding 3' from a first metallic material being nickel (Ni). This cladding is embedded in a second metallic material 3" being a nickel-chromium-alloy. The second metallic material 3" is fixed on the carrier 1 by means of welding or brazing 4.

In FIG. 4 a similar solution is shown. Here, the glass fiber 2 is again embedded in a cladding of nickel 3'. This cladding is covered by a coating 3" of a nickel-chromium-alloy. This coating 3" is fixed with the carrier 1 by means of welding or brazing 4.

In FIG. 5 an alternative is shown. Here the carrier 1 has a groove 5, in which the glass fiber 2 is inserted and securely fixed. For doing so, the glass fiber 2 is cladded with a cover 3' from nickel. Then, the covered glass fiber 2 is fixed on the carrier 1 by a nickel-chromium-alloy 3" which fills up the groove 5.

Figure 6:
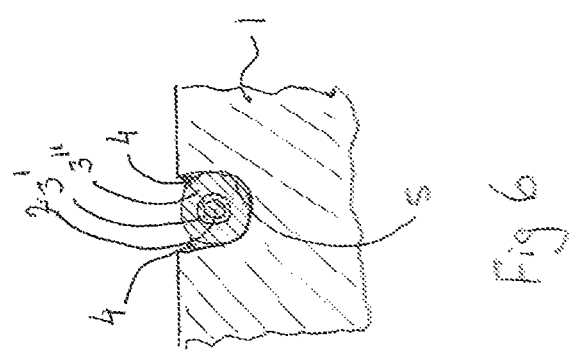
FIG. 6 shows a front view of a glass fiber which is fixed in a groove of a carrier, similar to FIG. 5.

A similar solution is shown in FIG. 6. Here, the carrier 1 again has a groove 5 in which the glass fiber 2 is inserted. The glass fiber 2 is embedded in a nickel cladding 3'. The cladding 3' is embedded by a nickel-chromium-alloy 3". The fixation of the coating of nickel-chromium-alloy 3" is fixed in the groove 5 by means of welding or brazing 4.

Figure 7A:
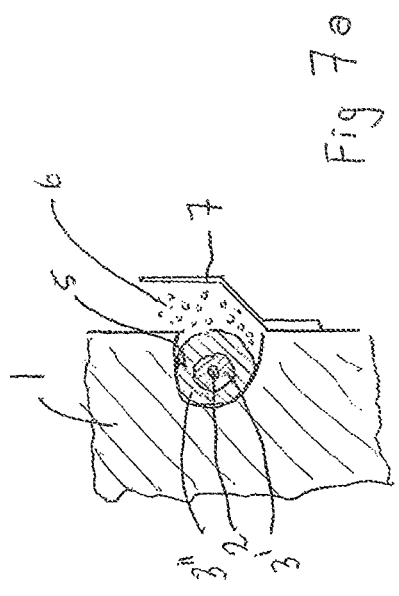
FIG. 7a shows the process of fixing a glass fiber in a groove of a carrier in a first, early state.
Figure 7B:
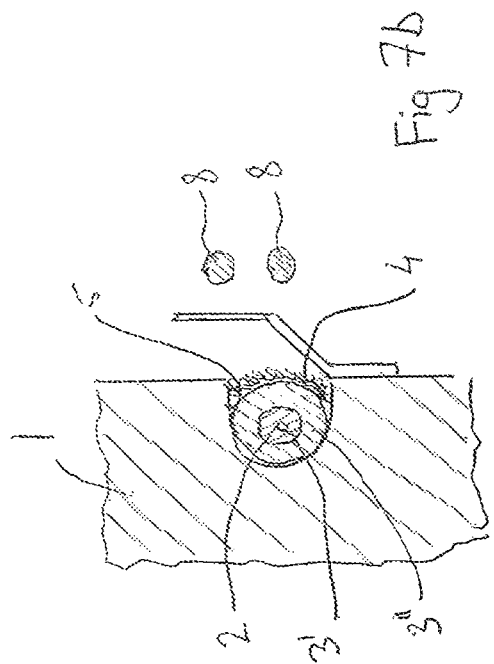
FIG. 7b shows the process of fixing a glass fiber in a groove of a carrier in a second, later state.

In FIG. 7a and FIG. 7b a process is depicted by which a fixation as shown in FIG. 6 can be realized. Here, a container 7 is arranged at the carrier 1 when the embedded glass fiber 2 (coated again by a nickel layer 3' and a layer form a nickel-chromium-alloy 3") is arranged in a groove 5 in the carrier 1. The container 7 is filled with braze paste 6. This is shown in FIG. 7a.

Heating elements 8 being inductive heaters are arranged near the container 7. Due to the heat produced by the inductive heaters 8 the braze paste 6 melts and forms the brazing 4 which is shown in FIG. 7b. Afterwards, the container 7 is removed.

The proposed connection technology can be used to fix a glass fiber 2 firmly between two points on the carrier 1 to use the fiber Bragg grating (FBG) method for measurement of specific data.

For the cladding of the glass fiber 2 itself, pure material—specifically nickel (Ni) or chromium (Cr)—is preferred. This gives a very dense and defect free coating.

For the outer coating a selection can be made from suitable alloys between nickel (Ni) and chromium (Cr) with or without additional elements such as B, Fe, Mn, Si, Ti, which can be selected to obtain a harder or more ductile coating and/or to reduce the melting temperature for the coating or later brazing or welding to be applied.

Beside pure nickel also nickel can be used which is alloyed with a maximum of 2 weight-% titan (Ti), 1 weight-% silizium (Si) or a nickel-alloy with a maximum of 3.5 weight-% boron (B), 4.5 weight-% silizium (Si), between 5 and 7 weight-% chromium (Cr) and about 4 weight-% ferrum (Fe).

For the outer coating 3" pure chromium (Cr) can be employed but also chromium alloyed with a maximum of 20 to 60 weight-% nickel (Ni). The outer coating has preferably between 0.2 to 0.5 mm wall thickness in order to enable microlaser welding or brazing, Here, a nickel-chromium-alloy is preferred with 20 to 80 weight-% nickel (Ni) and a balance of chromium (Cr). Also, an alloy has been found suitable with 20 to 70 weight-% nickel (Ni), 1 to 5 weight-% mangan (Mn), a maximum of 1 weight-% silizium (Si) and a balance of chromium (Cr). Also the addition of copper (Cu) can be beneficial.

Figure 8:
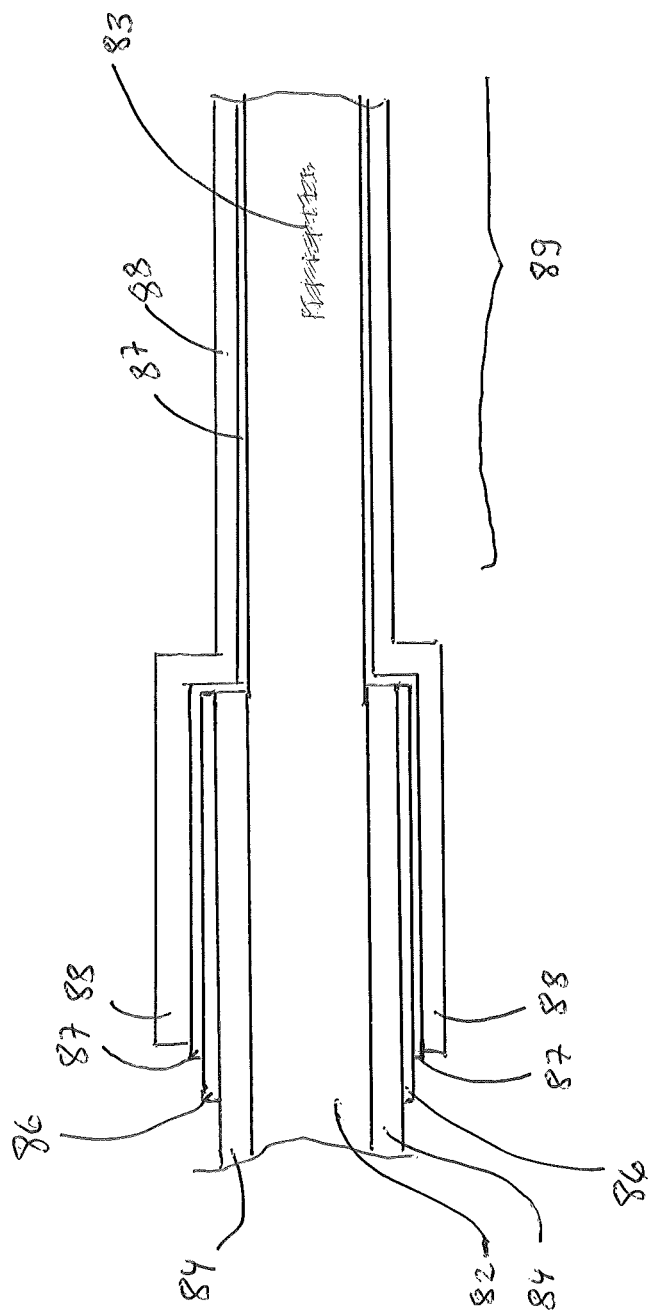
FIG. 8 shows a side sectioned view of a glass fiber core and a series of metallic coatings.

In FIG. 8 a glass fiber with core 82, suitably working up to 1000 degrees Centigrade, comprising an in-core Bragg grating 83 has been prepared to be vacuum brazed to a stainless steel carrier. The glass fiber 82 typically comprises a copper coating 84 which outside the attachment area 89 is protected by a thin layer of electroplated Ni 86 during activation. A thin chemical Ni layer 87 is then added to make the bare fiber part electrically conducting and finally an electroplated Ni-layer 88, about 20 micrometers thick is added. The length 89 along which the glass fiber 82 is to be mounted to a carrier will be bare before the Ni layers 87, 88 are added and will comprise one or more in-core Bragg gratings 83.

In FIG. 9 a carrier 91, suitably of 430 stainless steel, is mounted on an outer ring 99 of a bearing. This is of course one of many different location on a bearing that the carrier can be mounted. The carrier described can suitably be mounted on any hardened steel, especially hardened bearing steel. The carrier 91 can suitably be in the range of 25 millimeter long in the direction of a mounted optical fiber 92, 5 millimeter wide and 1 millimeter thick. It is important that the carrier 91 is thin so that the optical fiber 92 is as close as possible to the part it is supposed to measure as the optical fiber is on one side and the machine part on the other side. The carrier 91 suitable comprises a groove with a diameter/depth in the range of 0.3 millimeter for a nickel coated optical fiber 92. A prepared optical fiber 92, suitably of the kind according to FIG. 8, is put in the groove and a filling material 94 is added between the nickel coated fibers and the stainless steel carrier 91. The filling material can suitably be brazing alloy Cusin-1 ABA paste. The optical fiber 92 is then embedded into the carrier 91 by brazing, suitably vacuum brazing. After the optical fiber 92 has been embedded into or onto the carrier 91, the carrier 91 is then attached to a machine part which is to be measured as to for example temperature and/or strain. The attachment of the carrier 91 to, as in this example, an outer bearing ring, is according to this embodiment done by pulse arc welding, such as micro TIG welding in an Argon atmosphere to form welds 98. The optical fiber 92 will then have a stiff connection with the machine part it is meant to measure.

REFERENCE NUMERALS

1 Machine arrangement (carrier)
2 Glass fiber
3 Metallic material
3' First metallic material
3" Second metallic material
4 Welding/Brazing
5 Groove
6 Braze paste
7 Container
8 Heating element (induction heating element)
82 Glass fiber with core, suitably working up to 1000 degrees C.
83 In-core Bragg grating
84 Copper, Cu, coating of fiber
86 Thin electroplated Ni to protect the Cu during activation
87 Thin chemical Ni layer to make the bare fiber part electrically conducting
88 Final electroplated Ni-layer, about 20 micrometers thick
89 Carrier mounting area
91 Carrier, suitably 430 stainless steel
92 Optical fiber, suitable working up to a 1000 degrees C.
94 Filling material, suitably brazing alloy Cusin-1 ABA paste
98 Pulse Arc welding, micro TIG (Tungsten Inert Gas) in Argon atmosphere
L Longitudinal axis

The invention claimed is:

1. An arrangement comprising a glass fiber connected to a carrier, the carrier being configured to be welded to a machine part,
   wherein the glass fiber is coated with a first metal, the first metal being materially bonded to the glass fiber,
   wherein the carrier includes a surface and a groove in the surface and wherein the glass fiber coated with the first metal is located in the groove, and
   including a brazing material in the groove materially bonded to the carrier and filling the groove to at least a level of the surface and holding the glass fiber coated with the first metal in the groove, and
   including a metallic material different than the first metal, the metallic material encasing the first metal,
   wherein the first metal consists essentially of chromium or consists essentially of nickel and wherein the metallic material is an alloy of chromium and nickel, and
   wherein the metallic material is materially bonded to the first metal and materially bonded to the brazing material.

* * * * *